UNITED STATES PATENT OFFICE.

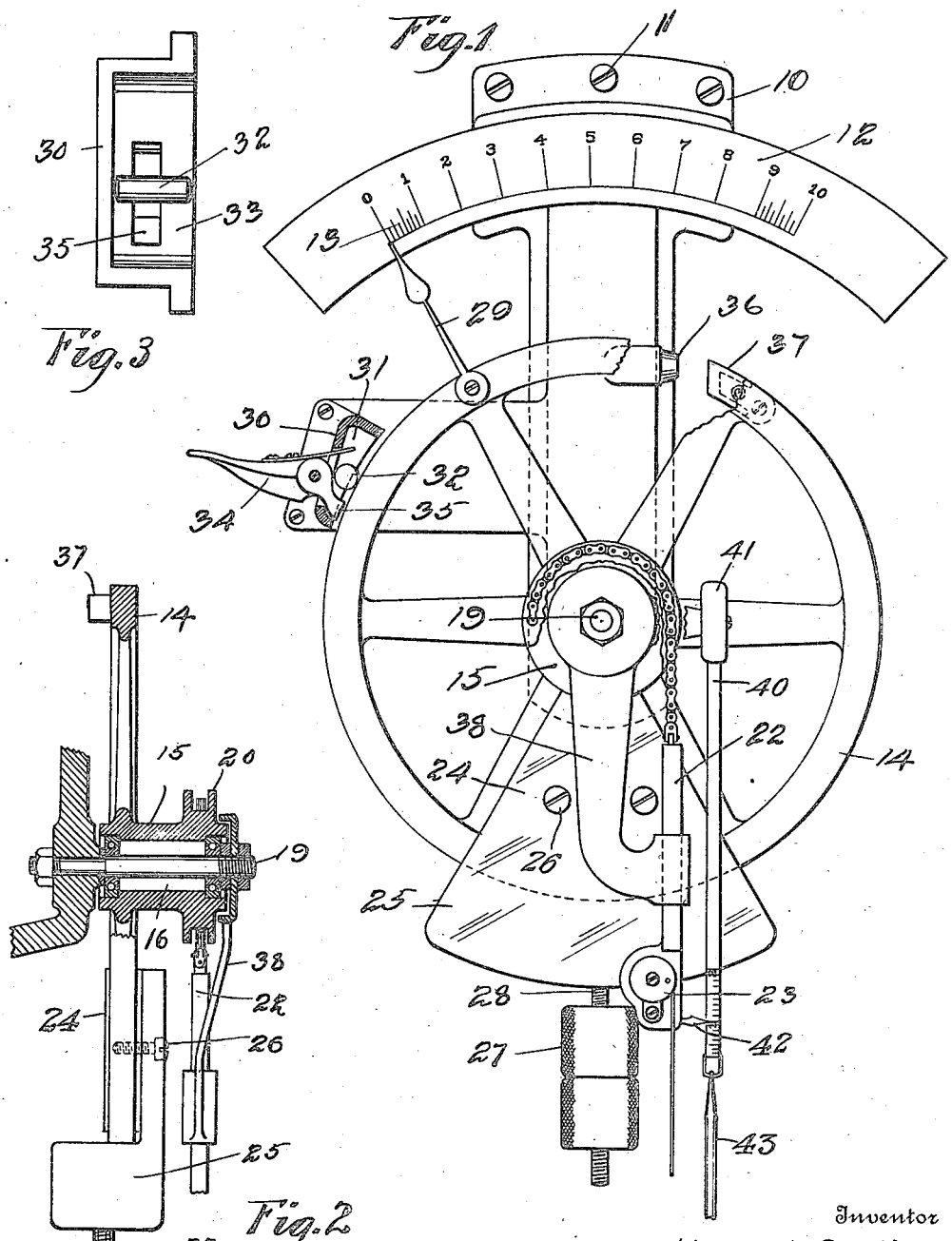

HENRY L. SCOTT, OF PROVIDENCE, RHODE ISLAND.

TESTING-MACHINE.

1,282,644.　　　　　Specification of Letters Patent.　　Patented Oct. 22, 1918.

Application filed April 20, 1917. Serial No. 163,344.

*To all whom it may concern:*

Be it known that I, HENRY L. SCOTT, a citizen of the United States, and resident of the city of Providence, in the county of Providence and State of Rhode Island, have invented certain new and useful Improvements in Testing-Machines, of which the following is a specification.

This invention relates to testing machines, and has for its object to provide a head portion of a testing machine, which is extremely simple, practical and inexpensive in construction, the same being more particularly adapted for use in testing light stock or material such as paper, thread, twine, cord and the like where but comparatively light testing power is required.

A further object of the invention is to provide a weighted rotatable resistance member having means whereby the testing tension may be exerted thereon to rotate the same, said member being provided with means whereby it may be readily locked at any point in its rotation and as readily released from said locked position.

A still further object of the invention is to provide simple and effective means carried directly on the resistance member whereby the power exerted may be indicated.

With these and other objects in view, the invention consists of certain novel features of construction, as will be more fully described, and particularly pointed out in the appended claims.

In the accompanying drawings:

Figure 1— is a front elevation of the head portion of a testing machine of my improved construction.

Fig. 2— is a sectional side elevation of the resistance wheel.

Fig. 3— is a view looking at the inner side of the ball of the roll clutch mounted to engage the periphery of the resistance wheel.

Referring to the drawings, 10 designates the frame of the machine on which the operating mechanism is mounted, which frame may be attached to any suitable support by means of the screws 11. In the upper end of this frame is mounted a segmental plate 12 graduated at 13 to indicate the pull or tension in pounds or other units of measure applied to the goods being tested.

The resistance member is herein shown in the form of a wheel 14 provided with a hub 15 formed hollow as at 16 in which hollowed portion is mounted two sets of ball bearings 17 and 18 at either end thereof, said bearings being arranged to rotate upon the central supporting pin 19.

Near the outer end of this hub is formed a drum 20 around which is wound a chain, cord or other flexible band 21, the lower end of which is connected to the bar 22, which carries the work gripping clutch 23.

When this machine is built for the purpose of testing very light stock such as paper, thread and other similar light materials, a weight 24 is cast or molded between the arms of the wheel, and when so constructed a scale 12 proportioned to this weight is mounted in the frame above, but when it is desired to use this machine on a heavier class of goods such as fish line, cords, twine and the like, it is often necessary to apply a heavier weight which is readily done by bolting an extension piece 25 to the first weight by means of the screws 26 and when so weighted a scale of a different calibration is employed.

It is found in practice in order to cause the movement of the resistance wheel to exactly correspond with the calibration of the scale, to provide an adjustable weight 27 on the screw 28, whereby this weight may be readily raised or lowered to cause the scale to correctly indicate the power applied to the goods being tested.

In this simple construction of head, a pointer 29 may be secured to the periphery of the wheel to work over this scale so that a direct reading may be obtained without the necessity of gearing up the pointer relative to the movement of the resistance wheel as is the case with other testing machines.

I do not wish to be limited to the exact arrangement of the scale and pointer shown as other arrangements of the same may be made if desired by which the two will coöperate to indicate the tension applied to the work.

One of the essential features of my improved construction is the roll clutch arrangement for engaging the periphery of the wheel to prevent a backward motion of the same when the work breaks and the test completed.

This clutch is constructed of a frame 30 chambered out at 31 on its under side and in which chambered portion a roll 32 works against the periphery of the wheel, the casing being set on a slight angle whereby a movement of the wheel in one direction releases the roll, but a slight movement of its periphery in its opposite direction causes the roll to bite against it and the inner surface of this frame and so securely lock the wheel against further movement in the backward direction until after the reading has been taken from the scale.

An operating handle 34 pivoted in this clutch is so arranged that upon pressing downward upon the same its inner end engages and raises the roll from its jammed position and permits the wheel to rotate back to normal. A rubber bumper 36 is positioned in the frame against which a stop lug 37 on the wheel brings up to prevent excessive rotation of the wheel in a backward direction when released by the clutch.

An arm 38 is fixed to the outer end of pin 19 the same having a boss through which the bar 22 is guided.

A flexible scale, preferably a metal tape, 40 is automatically held under spring tension in its casing 41, the same being connected by means of the hook 43 to the tension-applying mechanism, (not shown) and a pointer 42 located on the clutch-carrying member extends over the graduations on said tape to indicate the stretch of the goods while being tested.

I have illustrated one means whereby my invention may be carried out, but I do not wish to limit myself to the specific construction shown and described as various changes in the several features may be necessary. I, therefore, desire it to be understood that I reserve the privilege of resorting to all the mechanical changes to which the device is susceptible, the invention being defined by the appended claims.

I claim:

1. In a testing machine, a head portion comprising a rotatable wheel, a hub on said wheel, a flexible testing tension band on said hub having a work gripper connected thereto, a guide for the free end of said band, a resistance weight carried by said wheel, a roll lock for frictionally gripping the periphery of said wheel to retain the same at any point of rotation, and a graduated plate and pointer coöperating therewith providing a direct reading to show the tension applied.

2. In a testing machine, a head portion comprising a rotatable wheel of relatively large diameter, a hub on said wheel, a flexible band on said hub having a work gripping device connected thereto and through which testing tension is applied to the work, an adjustable resistance weight carried by said wheel, means engaging the periphery of said wheel to lock it at any point of rotation, a graduated plate and a pointer coöperating therewith and operated by said wheel for indicating the tension applied to the work.

In testimony whereof I affix my signature in presence of a witness.

HENRY L. SCOTT.

Witness:
HOWARD E. BARLOW.